US008488912B2

(12) United States Patent
Gossweiler, III et al.

(10) Patent No.: US 8,488,912 B2
(45) Date of Patent: Jul. 16, 2013

(54) SYSTEMS AND METHODS FOR SOCIALLY-BASED CORRECTION OF TILTED IMAGES

(75) Inventors: Richard Carl Gossweiler, III, Sunnyvale, CA (US); Maryam Kamvar, San Francisco, CA (US); Shumeet Baluja, Leesburg, VA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/338,097

(22) Filed: Dec. 27, 2011

(65) Prior Publication Data

US 2012/0098855 A1 Apr. 26, 2012

Related U.S. Application Data

(63) Continuation of application No. 12/256,827, filed on Oct. 23, 2008, now Pat. No. 8,090,219.

(51) Int. Cl.
*G06T 3/60* (2006.01)
(52) U.S. Cl.
USPC .......................................... 382/296; 382/311
(58) Field of Classification Search
USPC .................... 382/289, 296, 309, 311
See application file for complete search history.

(56) References Cited

PUBLICATIONS

International Search Report cited in International Application No. PCT/US2009/061895, dated Dec. 23, 2009, 3 pages.
Written Opinion of the International Searching Authority cited in International Application No. PCT/US2009/061895, dated Dec. 23, 2009, 7 pages.

Rich Gossweiler et al., "What's Up CAPTCHA? A CAPTCHA Based on Image Orientation", Proceedings of the 18th International Conference on World Wide Web, WWW 2009, Apr. 20-24, 2009, pp. 841-850.
Jiebo Luo et al., "Psychological Study of Image Orientation Perception", Human Vision and Electronic Imaging VIIII, Proceedings of SPIE-IS&T Electronic Imaging, SPIE vol. 5007 (2003), pp. 364-377.
Jiebo Luo et al., "A Probabilistic Approach to Image Orientation Detection via Confidence-based Integration of Low-Level and Semantic Cues", Proceedings of the 2004 IEEE Computer Society Conference on Computer Vision and Pattern Recognition Workshops (CVPRW'04), Jun. 27, 2004, 8 pages.
Siegle, "Sample Size Calculator," *Neag School of Education—University of Connecticut*, download from http://www.gifted.uconn.edu/siegle/research/Samples/samplecalculator.htm on Sep. 18, 2008; 2 pages.
Adamchak et al., "A guide to monitoring and evaluating adolescent reproductive health programs," *Pathfinder International, FOCUS on Young Adults*, 2000, pp. 265-274.
"Sampling Information," *Minnesota Center for Sampling Research—University of Minnesota*, 2007, 4 pages.
Li, Wenju, et al., "A New Method for Vehicle License Plate Tilt Correction," in *Information and Control*, No. 2, vol. 33, pp. 231-235, Apr. 20, 2004 (including English Abstract).
English translation of Office Action mailed Mar. 4, 2013, in Chinese Patent Application No. 200980151879.7, Google Inc., filed Oct. 23, 2009.

*Primary Examiner* — Andrew W Johns
(74) *Attorney, Agent, or Firm* — Sterne, Kessler, Goldstein & Fox P.L.L.C.

(57) ABSTRACT

Systems and methods for socially-based correction of tilted images. In an embodiment, the present invention levels tilted images by (1) receiving an image; (2) rotating the image by a random angle; (3) requesting at least one user rotate the image to level the image; (4) determining a collective user-suggested angle based on the rotations of each user; and (5) transmitting, over a communication network, a correction angle, where the correction angle is based on the random angle and the collective user-suggested angle.

18 Claims, 11 Drawing Sheets

SYSTEMS AND METHODS FOR SOCIALLY-BASED CORRECTION OF TILTED IMAGES

CROSS REFERENCE TO RELATED APPLICATIONS

This application is a continuation of U.S. Non-Provisional application Ser. No. 12/256,827, filed on Oct. 23, 2008, now U.S. Pat. No. 8,090,219, which is hereby incorporated by reference in its entirety.

FIELD OF THE INVENTION

The present invention relates to digital image processing.

BACKGROUND

Users take digital pictures at all zoom levels and from all angles. Sometimes, these digital pictures are taken such that the subject does not appear upright. In some cases this is intentional, and in other cases this is not intentional. Users also scan analog and/or digital items in order to create digital soft copies. Again, sometimes unintentionally, the analog and/or digital items are scanned in at a slight tilt.

If desired by the user(s), image processing techniques are available to automatically level these tilted digital images. However, in some cases, image processing techniques cannot level these tilted digital images because it is difficult to decipher what is or should be upright. As an example, a computer using image processing techniques may find it difficult to determine how to level a close-up picture of a flower and its petals.

BRIEF SUMMARY

Embodiments of this invention relate to leveling tilted images. A system embodiment of this invention provides a socially-based correction of a tilted image. A system embodiment includes an image rotator, an image displayer, and an image angle calculator. The image rotator is configured to receive an image, and is configured to rotate the image by a random angle. The image displayer, coupled to the image rotator, is configured to display the image, and is configured to request that at least one user rotate the image to level the image. The rotation represents an individual user-suggested angle. And finally, the image angle calculator, coupled to the image displayer and the image rotator, is configured to determine a collective user-suggested angle based on the individual user-suggested angle of each user, and is configured to calculate a correction angle based on the collective user-suggested angle and the random angle.

A method embodiment of this invention provides a socially-based correction of a tilted image. The method embodiment includes receiving an image, rotating the image by a random angle, requesting that at least one user rotate the image to level the image, the rotation representing an individual user-suggested angle, determining a collective user-suggested angle based on the individual user-suggested angle of each user, and transmitting, over a communication network, a correction angle, where the correction angle is based on the random angle and the collective user-suggested angle.

In this way, suggestions on how to level a tilted image may be given to an owner of the tilted image. Suggestions may even be given for those images in which a computer or image processing techniques cannot decipher if an image is upright.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS

Embodiments of this invention relate to leveling tilted images. This can include a socially-based correction of tilted images. While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility. The following sections describe systems and methods for leveling tilted images.

System

Figure 1:
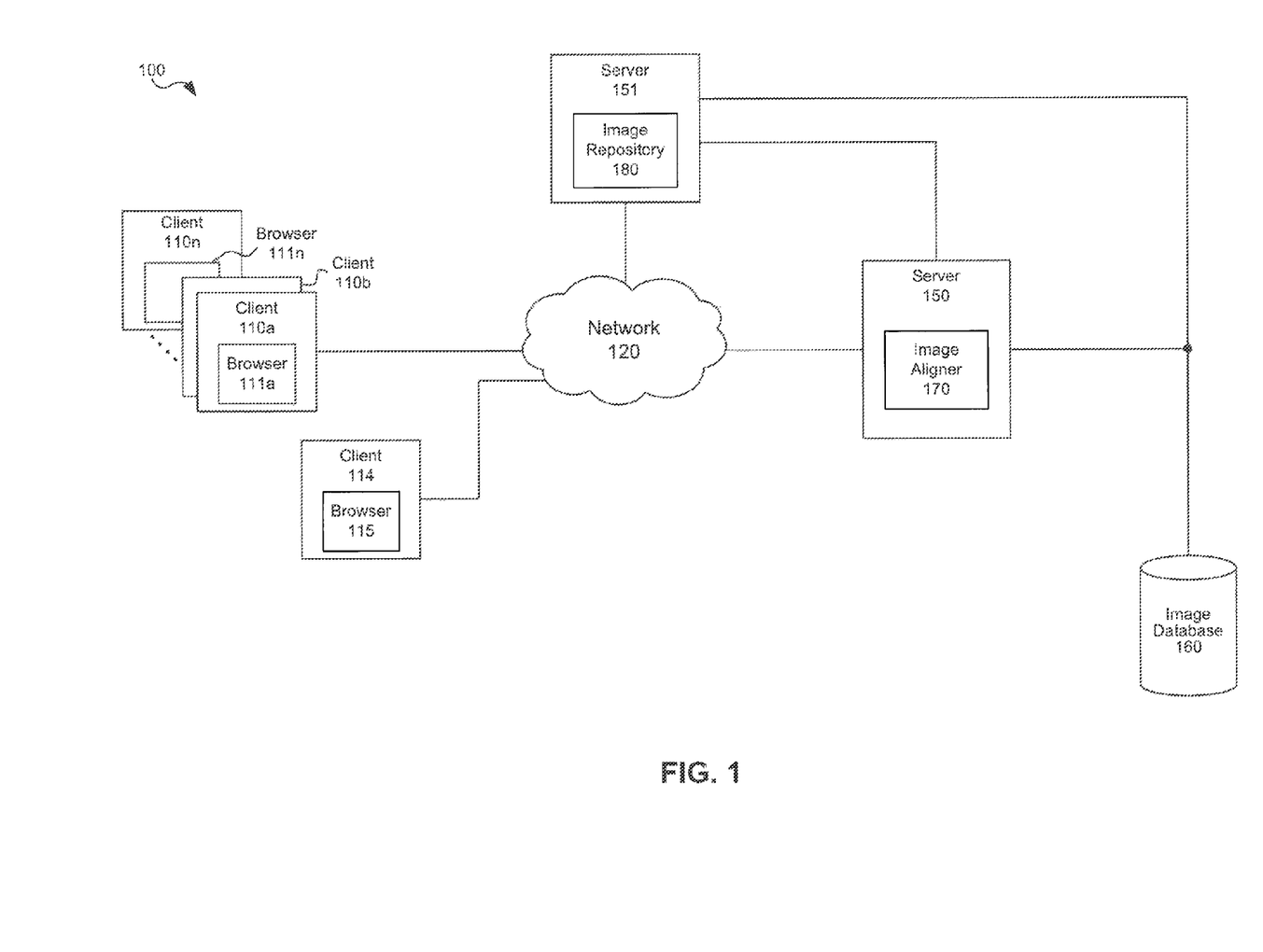
FIG. 1 is an architecture diagram of a system for leveling tilted images according to an embodiment of the present invention.

This section describes systems suitable for leveling tilted images. As used herein, the term "tilted image" refers to an image that has horizontal borders aligned along the horizontal axis and vertical borders aligned along the vertical axis, but contains a scene that may not be clearly aligned along the horizontal axis or the vertical axis. FIG. 1 is an architecture diagram of a system for leveling tilted images according to an embodiment of the present invention. FIG. 1 shows system 100. System 100 includes clients 110*a-n*, a client 114, a server 150, a server 151, and an image database 160, coupled by one or more networks 120. As used herein, the term "database" includes, but is not limited to, table databases, hierarchical databases, network databases, relational databases, dimensional databases, and/or object databases.

Each of clients 110*a-n* and 114, servers 150 and 151, and image database 160 may be implemented on a computing device. Such a computing device can include, but is not limited to, a personal computer, mobile device such as a mobile phone, workstation, embedded system, game console, television, or set-top box. Such a computing device may include, but is not limited to, a device having a processor and memory for executing and storing instructions. Such a computing device may include software, firmware, hardware, or a combination thereof. Software may include one or more applications and an operating system. Hardware can include, but is not limited to, a processor, memory and graphical user interface display.

Clients 110a-n and 114, servers 150 and 151, and image database 160 may be implemented on one or more computing devices at the same or at different locations. For instance, clients 110a-n and 114, servers 150 and 151, and image database 160 may be remote from one another on different computing devices coupled to a network, such as network 120. In still another example, servers 150 and 151 and image database 160 may be implemented on one or more computing devices at a common location and coupled to remote clients 110a-n and 114 over network 120. Other combinations and configuration for arranging clients 110a-n and 114, servers 150 and 151, and image database 160 may be used as would be apparent to a person skilled in the art given this description.

Network 120 may be any network or combination of networks that can carry data communication. Such network 120 can include, but is not limited to, a local area network, medium area network, and/or wide area network such as the Internet. Network 120 can support protocols and technology including, but not limited to, World Wide Web protocols and/or services. Intermediate web servers, gateways, or other servers may be provided between components of system 100 depending upon a particular application or environment.

In one exemplary embodiment, clients 110a-n and 114 include browsers 111a-n and 115, respectively. For example, browsers 111a-n and 115 may be web browsers or other types of browsers for browsing content. Browsers 111a-n and 115 can send a request over network 120 to one or more of servers such as servers 150 and 151 and receive a response from one or more of servers such as servers 150 and 151. As an example, not to be limiting, the request may be a hypertext transfer protocol (HTTP) request. The HTTP request may contain parameters entered by a user using a user interface. The response may be an HTTP response. An HTTP response may contain web content, such as a hypertext markup language (HTML), images, video, or multimedia content.

Each of servers 150 and 151 may include a web server or may be coupled to communicate with a web server at the same or a different location. A web server is a software component that responds to an HTTP request with an HTTP response. As illustrative examples, the web server may be, without limitation, an Apache HTTP Server, Apache Tomcat, MICROSOFT Internet Information Server, JBOSS Application Server, WEBLOGIC Application Server, or SUN JAVA System Web Server. The web server may contain web applications which generate content in response to an HTTP request. The web server may package the generated content and serve the content to a client in the form of an HTTP response. Such content may include HTML, extensible markup language (XML), documents, videos, images, multimedia features, or any combination thereof. These examples are strictly illustrative and do not limit the present invention.

According to an embodiment, server 150 includes an image aligner 170. Automatically, or at the request of a user, image aligner 170 calculates an angle needed to level the tilt of a chosen image from image database 160.

According to an embodiment, server 151 includes an image repository 180. Image repository 180 may be any web-based or desktop-based application used to share, display, and/or store images, such as, for example, the chosen image. As an example, not to be limiting, image repository 180 may be Picasa Web Albums by Google. As is described in more detail below with respect to FIG. 3, image aligner 170 may communicate with image repository 180 to provide angles to level any tilted images managed by image repository 180.

Image database 160 stores digital images and/or digital videos. Image database 160 may supply digital images and/or digital videos to image aligner 170 and/or image repository 180. In an embodiment, image aligner 170 and/or image repository 180 may be configured to modify digital images and/or digital videos in image database 160 as necessary.

Each of browsers 111a-n and 115, image aligner 170, and image repository 180 may be implemented as software, hardware, firmware, or any combination thereof.

Figure 2:
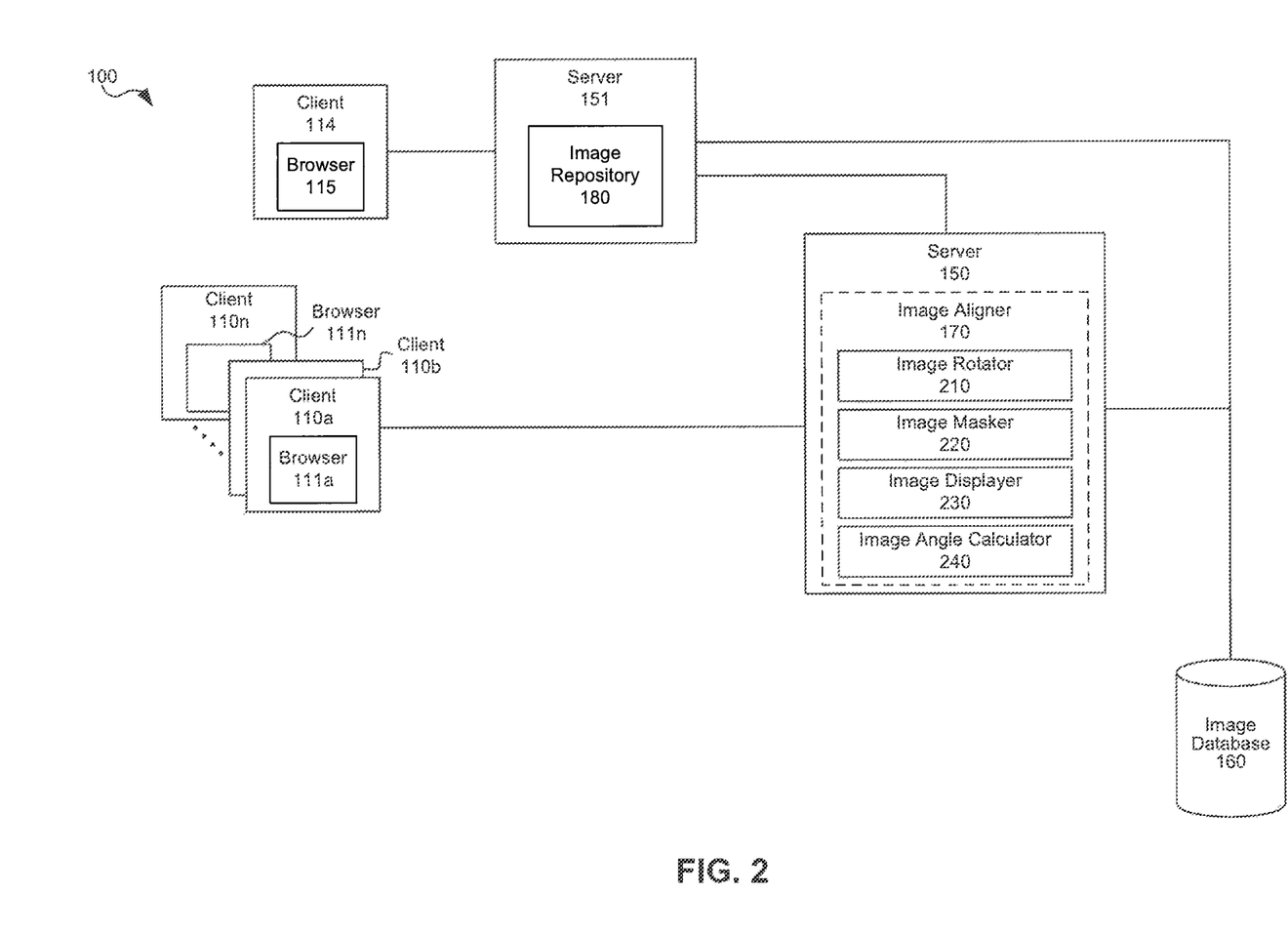
FIG. 2 is a more detailed diagram of the components of the system in FIG. 1, according to an embodiment of the present invention.

FIG. 2 is a more detailed diagram of the components of system 100 in FIG. 1, according to an embodiment of the present invention. As shown in FIG. 2, clients 110a-n may communicate with server 150, and server 150 may communicate with image database 160. In an alternate embodiment, not shown, image database 160 resides within memory in server 150. As discussed previously, this communication may take place over one or more networks 120, such as the Internet.

Image aligner 170 includes an image rotator 210, an image masker 220, an image displayer 230, and an image angle calculator 240. Image rotator 210 is configured to take a digital image or a frame of a digital video and rotate it by a randomly chosen angle. The digital image or frame may be rotated clockwise or counterclockwise between zero and 360 degrees. In an embodiment, the chosen digital image or frame is previously tilted at an unknown angle. The digital image or frame is further tilted by the randomly chosen angle. Note that image processing techniques may be used to identify digital images or frames that are originally tilted at an unknown angle.

Image masker 220 is configured to take the rotated digital image or frame and mask it. In an embodiment, this masking may include creating a round cut-out of the digital image or frame, where the round cut-out hides the borders and edges of the digital image or frame. In this way, a user that views the masked digital image or frame won't be influenced by the original boundaries if asked to level or align the digital image or frame. As used herein, the term "leveling" refers to correctly orienting an image. In alternate embodiments, the mask may be elliptical or of any polygonal shape. Image masker 220 may size the mask used to create the cut-out of the digital image or frame based on the dimensions of the digital image or frame. Note that the original digital image or frame is not permanently cropped. Note also that the masking may be performed before image rotator 210 rotates the digital image or frame. As is described in greater detail below, the masking is temporary.

Image displayer 230 is configured to display one or more rotated and masked digital images and/or frames to one or more users. Image displayer 230 may be incorporated in any application that has the capability of displaying digital images and/or frames. Image displayer 230 may also be a standalone application that has the capability of displaying digital images and/or frames. In an alternate embodiment, not shown, image displayer 230 may be a desktop application residing in one or more clients 110a-n. In either embodiment, image displayer 230 requests that each user rotate each displayed digital image or frame to eliminate any tilt. Image displayer 230 records the angles by which each user rotates each digital image or frame. An example of image displayer 230 is provided below with respect to FIG. 6.

Image angle calculator 240 is configured to calculate a correction angle to be used to level the original tilted digital image or frame using the angles recorded by image displayer 230 for the digital image or frame and the random angle chosen by image rotator 210. Image angle calculator 240 is described in more detail below with respect to FIG. 4.

In an embodiment, image repository 180 may suggest one or more corrections to the original digital image or frame using the angle calculated by image angle calculator 240. This suggestion may be sent to the owner of the digital image or frame over any communication network, such as, for example, network 120. Likewise, the owner may be notified of corrections when accessing the digital image or frame. In another embodiment, image repository 180 may automatically level the original digital image or frame using the angle calculated by image angle calculator 240.

In this way, image aligner 170 can use feedback from multiple users to submit suggestions on how to level tilted digital images or frames and to indicate if proper corrections have been made. Image aligner 170 can also use the feedback to lead to self-corrections of tilted digital images and/or frames.

Each of image rotator 210, image masker 220, image displayer 230, and image angle calculator 240 may be implemented as software, hardware, firmware, or any combination thereof.

In an alternative embodiment, not shown, image aligner 170 may be included in a client such as client 114.

Figure 3:
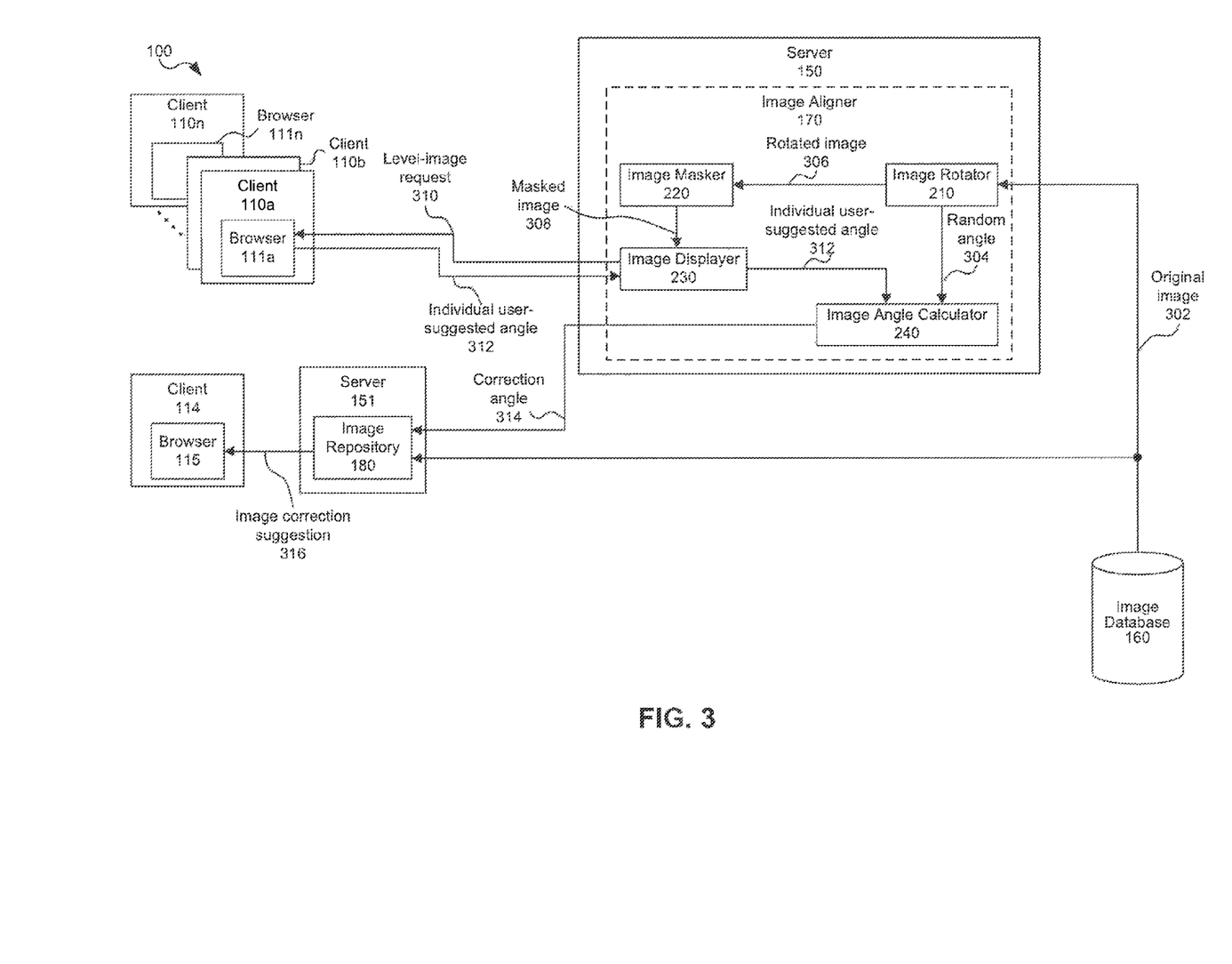
FIG. 3 is a diagram that displays how components of the system in FIG. 1 may interoperate, according to an embodiment of the present invention.

FIG. 3 is a diagram that displays how components of system 100 in FIG. 1 may interoperate, according to an embodiment of the present invention. In an embodiment, automatically, or at the request of any of clients 110a-n, image rotator 210 receives an original image 302 from image database 160. Original image 302 may be a digital image or a frame of a digital video. Original image 302 may be tilted at an angle unknown by image rotator 210.

Image rotator 210 rotates original image 302 by a random angle 304. In an embodiment, random angle 304 is between zero and 360 degrees, inclusive. This rotation of original image 302, represented by rotated image 306, is sent to image masker 220, while random angle 304 is sent to image angle calculator 240.

Image masker 220 may take rotated image 306 and perform the masking, as described above with respect to FIG. 2. The masked rotated image 306, represented by masked image 308, is sent to image displayer 230.

In an alternate embodiment, not shown, original image 302 is sent to image masker 220. Image masker 220 performs its masking, as described above, and sends a masked image to image rotator 210, such that the masked image can be rotated. Image rotator 210 then sends the masked, rotated image to image displayer 230.

Image rotator 210 and image masker 220 may rotate and mask several images, with image displayer 230 aggregating and displaying each rotated and masked image. For simplicity, system 100 is described herein in the case where one image is analyzed. As described above with respect to FIG. 2, image displayer 230 sends a level-image request 310 to one or more clients 110a-n, through browsers 111a-n, and provides the tools necessary to allow a user to rotate masked image 308. In an embodiment, each browser 111a-n sends an individual user-suggested angle 312 to image displayer 230. Individual user-suggested angle 312 represents the angle by which the individual user rotates masked image 308. As an example, between browsers 111a-n and server 150, individual user-suggested angle 312 may be HTTP parameters generated by browsers 111a-n. In an example, each user may choose the appropriate angle by which to rotate masked image 308 and press a submit button. This triggers each browser 111a-n to generate an HTTP request that includes individual user-suggested angle 312 as HTTP parameters. This example is merely illustrative and is not intended to be limiting.

In an embodiment, image displayer 230 sends individual user-suggested angle 312 to image angle calculator 240. In addition, image angle calculator 240 may receive random angle 304 from image rotator 210. Using individual user-suggested angle 312 and random angle 304, image angle calculator 240 calculates a correction angle 314 that, if original image 302 is rotated by correction angle 314, levels original image 302. The calculations and conditions necessary to determine correction angle 314 are described in greater detail below with respect to FIG. 4.

Correction angle 314 is sent to image repository 180 in the form of one or more signals transmitted via network 120. As described above, image repository 180 may suggest to an owner of original image 302 that original image 302 be rotated by correction angle 314. In an alternate embodiment, image repository 180 may automatically rotate original image 302 by correction angle 314.

Figure 4:
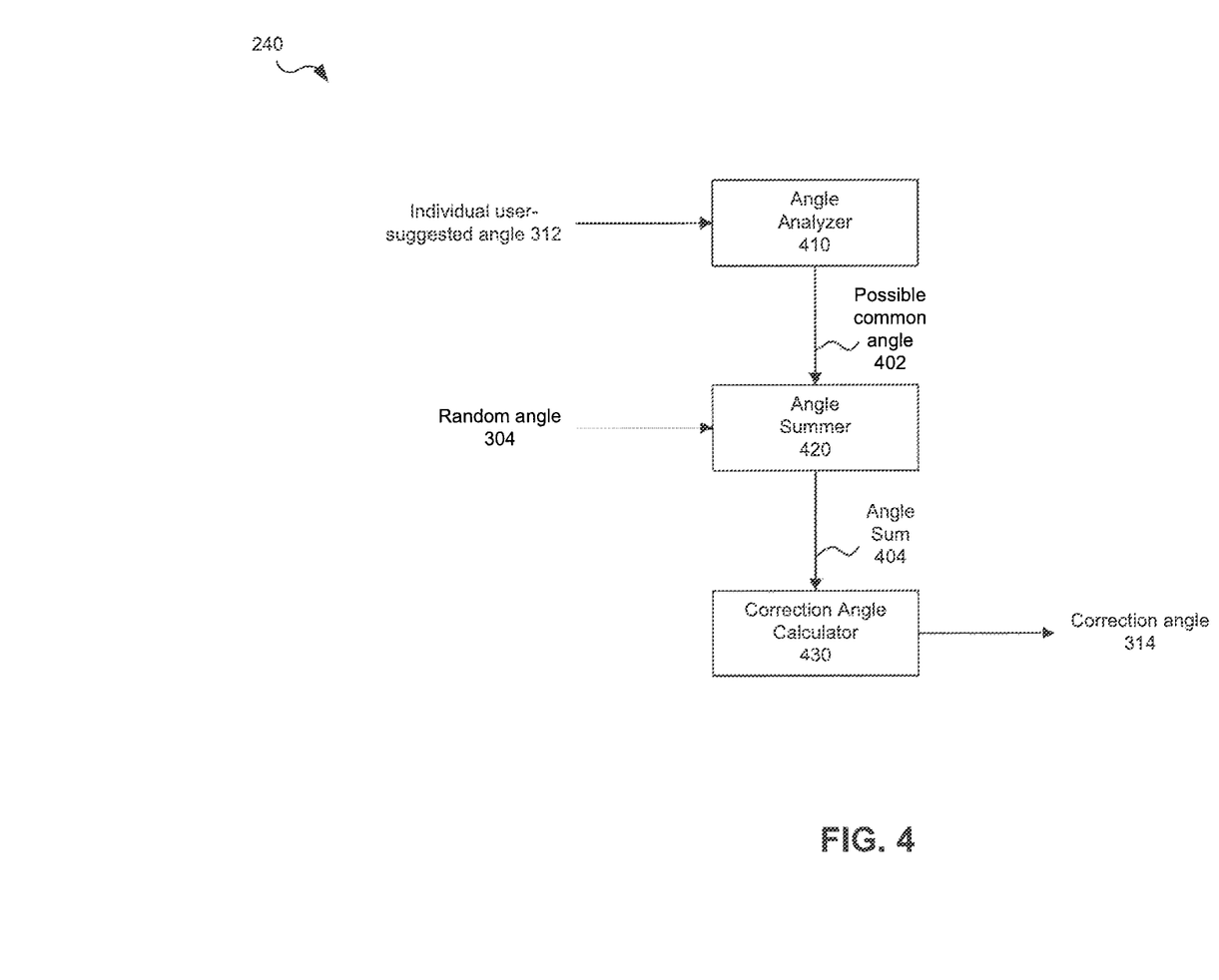
FIG. 4 is a more detailed diagram of the system in FIG. 1 according to an embodiment of the present invention.

The next section discusses the operation of image angle calculator 240 in greater detail.

FIG. 4 is a more detailed diagram of image angle calculator 240. As shown in FIG. 4, image angle calculator 240 includes an angle analyzer 410, an angle summer 420, and correction angle calculator 430. While image angle calculator 240 is described herein as including several separate components, the components may be combined, for example, so that the functionality of three components reside within a single component or program. Thus, the individual components shown in FIG. 4 are illustrative and not intended to limit the present invention.

Angle analyzer 410 receives individual user-suggested angle 312 from image displayer 230. In an embodiment, angle analyzer 410 compares individual user-suggested angle 312 to previous individual user-suggested angles 312. In a first embodiment, if individual user-suggested angle 312, along with a majority of the other previous individual user-suggested angles 312, is within a predetermined range of a center angle, then angle analyzer 410 sends the center angle as common angle 402 to angle summer 420. As an example, if individual user-suggested angle 312 falls within a range of 35 to 40 degrees and at least 50% of the other previous individual user-suggested angles 312 fall within the same range, then angle analyzer 410 may send a 37.5 degree angle to angle summer 420.

Alternative embodiments may use other thresholds and ranges. In a second embodiment, if individual user-suggested angle 312, along with a majority of the other previous individual user-suggested angles 312, is within a predetermined range of a center angle and if the number of previous individual user-suggested angles 312 exceeds a predetermined value, then angle analyzer 410 sends the center angle as common angle 402 to angle summer 420. As an example, if individual user-suggested angle 312 falls within a range of 55 to 56 degrees and at least 50% of the other previous individual user-suggested angles 312 fall within the same range, the number of other previous individual user-suggested angles 312 within 55 to 56 degrees exceeding 100, then angle analyzer 410 may send a 55.5 degree angle to angle summer 420.

In a third embodiment, if at least a predetermined percentage of previous individual user-suggested angles 312 fall within a predetermined range of a center angle, along with individual user-suggested angle 312, then angle analyzer 410 sends the center angle as common angle 402 to angle summer 420. As an example, if individual user-suggested angle 312, along with at least 35% of the other previous individual user-suggested angles 312, is within a range of 35 to 40 degrees, then angle analyzer 410 may send a 37.5 degree angle to angle summer 420.

Note that in alternate embodiments, angle analyzer 410 may send any angle within the predetermined range as common angle 402. Note also that if none of the conditions described above holds, then angle analyzer 410 may wait until the particular condition is chosen before outputting common angle 402. Note further that common angle 402 may change as more results are received of if further changes are made to original image 302.

In an alternate embodiment, angle analyzer 410 compares individual user-suggested angle 312 to previous individual user-suggested angles and sends a most frequent individual user-suggested angle to angle summer 420. For example, if 56 of 60 received individual user-suggested angles are 37.5 degrees, angle analyzer 410 may send a value of 37.5 degrees to angle summer 420.

In another alternate embodiment, angle analyzer 410 may analyze all individual user-suggested angles and calculate a standard deviation to determine common angle 402. For example, if by taking the standard deviation, the individual user-suggested angles are close to the mean of the individual user-suggested angles, the mean may be set as common angle 402. In some embodiments, individual user-suggested angles more than one standard deviation out of the mean may be removed such that outliers of the individual user-suggested angles are not used to determine common angle 402. Other statistical analysis may also be used to determine common angle 402.

In some embodiments, the number of individual user-suggested angles is needed to determine common angle 402. Such a number may be calculated based on statistical tests. For example, in one embodiment, a t-test is used to determine the number of individual user-suggested angles to be collected for correcting an image. A t-test is a statistical hypothesis test that is well-known in the art and can be applied to determine a sample size of a population. Other statistical algorithms for determining a sample size may also be used.

Angle summer 420 receives common angle 402 and random angle 306. In an embodiment, angle summer 420 sums common angle 402 and random angle 306 to produce angle sum 404. Angle summer 420 may send angle sum 404 to correction angle calculator 430.

Correction angle calculator 430 receives and analyzes angle sum 404. In an embodiment, correction angle calculator 430 determines whether or not angle sum 404 is nonzero. If angle sum 404 is nonzero, correction angle calculator 430 may set a collective user-suggested angle as common angle 402. Correction angle calculator 430 may send the sum as correction angle 314 to image repository 180. If angle sum 404 is zero, then it may indicate original image 302 was not tilted at any angle since random angle 306 was canceled out by common angle 402. In this case, correction angle calculator 430 may not send out any correction angle 314. In a further embodiment, correction angle calculator 430 determines whether angle sum 404 is within a predetermined range surrounding zero. If angle sum 404 is within the predetermined range, then correction angle calculator 430 acts as if angle sum 404 is zero. As an example, the predetermined range may be five degrees.

Note that any angle may be positive or negative in value. In an embodiment, a direction that an image is rotated determines the sign of the angle. In an embodiment, rotating the image clockwise may result in a positive angle value. Likewise, rotating the image in a counterclockwise fashion may result in a negative angle value. In an alternative embodiment, rotating clockwise and counterclockwise may result in a negative and positive value, respectively.

In this way, data collected from one or more users may allow an owner of an image to receive a suggestion on how to level the image. Specifically, an owner of the image may receive socially-based suggestions on how to level a tilt of the image. This may be extremely useful in the event a computer or image processing techniques cannot decipher if a digital image or frame is upright.

Method

Figure 5:
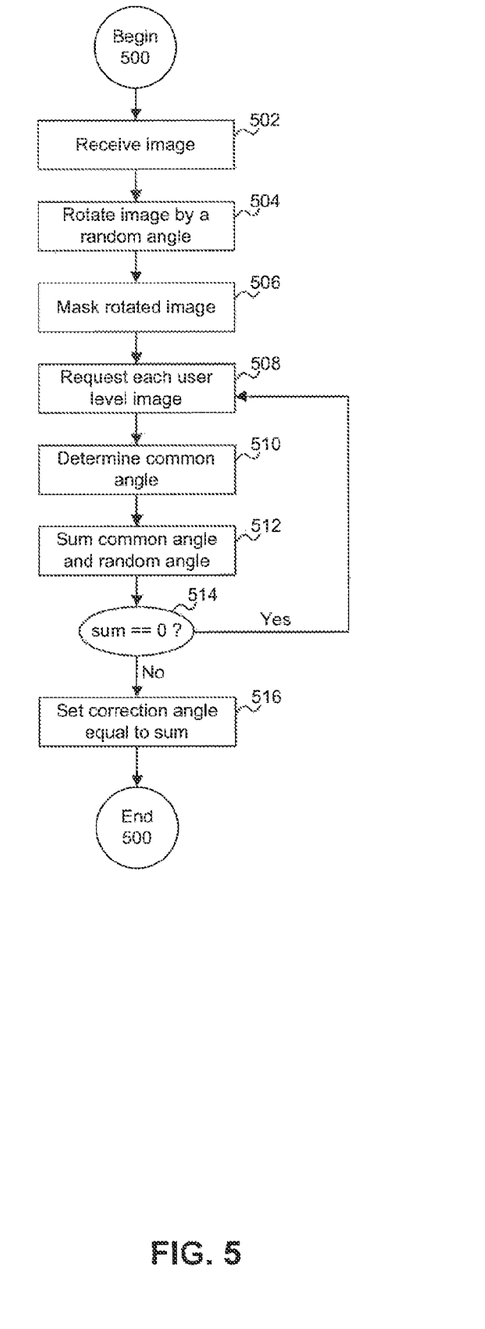
FIG. 5 is a flowchart of a method for leveling tilted images according to an embodiment of the present invention.

This section describes a method used to level tilted images. FIG. 5 is a flowchart of a method 500 for leveling tilted images according to an embodiment of the present invention. While method 500 is described with respect to an embodiment of the present invention, method 500 is not meant to be limiting and may be used in other applications. In an example, method 500 may be used to suggest a tilt correction to an image stored in an image repository, such as image repository 180 from FIGS. 1-3. However, method 500 is not meant to be limited to image repository 180.

As shown in FIG. 5, method 500 begins at stage 502 where a tilted image is received. In an embodiment, the tilted image is received from an image database that stores a plurality of images. Once stage 502 is complete, method 500 proceeds to stage 504.

At stage 504, the tilted image is rotated by a random angle. Once stage 504 is complete, method 500 continues to stage 506.

At stage 506, the image is masked. In an embodiment, this masking includes covering the corners of the image. This may be accomplished via a circular mask. In a further embodiment, the circular mask is sized according to the size of the original image. Once stage 506 is complete, method 500 proceeds to stage 508.

In an alternate embodiment, not shown, method 500 proceeds to stage 506 once stage 502 is complete. In such an embodiment, method 500 continues to stage 504 once stage 506 is complete, and then proceeds to stage 508 once stage 504 is complete.

At stage 508, one or more users are asked to level the image. In an embodiment, this may be accomplished via an image displayer, such as image displayer 230 of FIGS. 2-3. Note that the image displayer may request that the one or more users rotate other images along with the image. Once stage 508 is complete, method 500 proceeds to stage 510.

At stage 510, a common angle is determined. In an embodiment, the common angle may be an angle where a majority of the one or more users rotates the image by an angle that is within a predetermined range of the common angle. In another embodiment, the common angle may be an angle where a predetermined number of the one or more users rotate the image by an angle that is within a predetermined range of the common angle. In yet another embodiment, the common angle may be an angle used by most of the users to rotate the image. Once stage 510 is complete, method 500 continues to stage 512.

At stage 512, the common angle and the random angle are summed together. Once stage 512 is complete, method 500 proceeds to stage 514.

At stage 514, a check is performed to determine if the sum equals zero. If the sum is zero, method 500 returns to stage 508. If the sum is nonzero, method 500 continues to stage 516.

At stage 516, a correction angle is set equal to the sum. In an embodiment, the correction angle may be used to suggest to an owner of the image an angle by which the tilt of the image may be corrected. Once stage 516 is complete, method 500 ends.

Stages 502, 504, 506, 508, 510, 512, 514, and 516 may be implemented as software, hardware, firmware, or any combination thereof.

EXAMPLES

Figure 6:
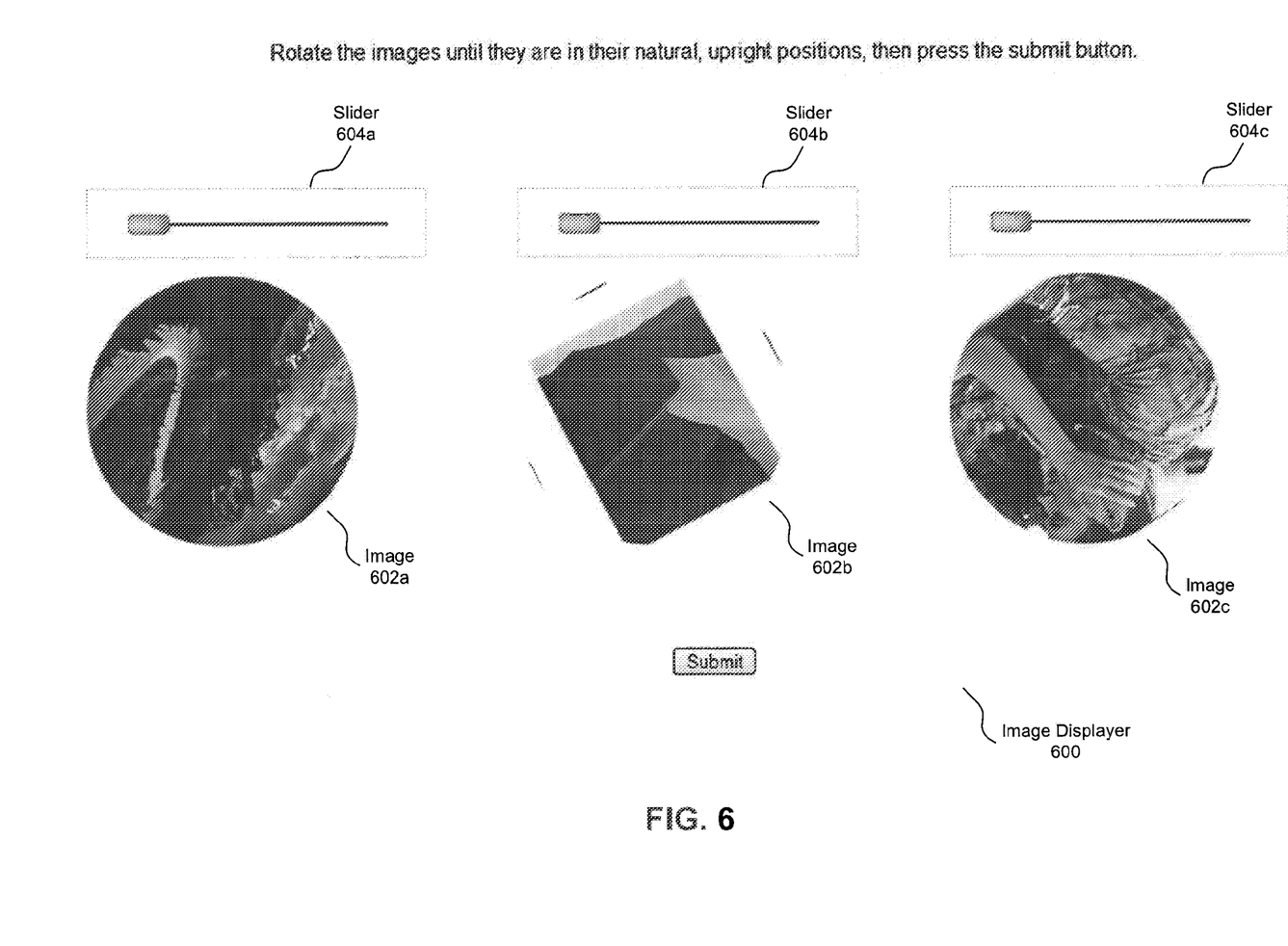
FIG. 6 is an example image displayer according to an embodiment of the present invention.

FIG. 6 is an example image displayer according to an embodiment of the present invention. As shown in FIG. 6, an image displayer 600 may include images 602a-c and sliders 604a-c. Note that image displayer 600 may be an example of image displayer 230 of FIGS. 2-3. Image displayer 600 may appear in a browser on the client. In an embodiment, images 602a-c are already masked and randomly rotated. Note that a circular mask is used; however any type of polygonal mask may be suitable.

Sliders 604a-c may be used to rotate each respective image 602a-c. In an embodiment, each slider 604a-c ranges from zero to 360 degrees left to right, and each image 602a-c rotates clockwise. In an alternate embodiment, each image 602a-c may rotate counterclockwise. In a further alternate embodiment, some of images 602a-c may rotate clockwise, while others may rotate counterclockwise. Note also that more images and sliders may be displayed other than what is shown in FIG. 6.

A user may be requested to rotate each image 602a-c, with image displayer 600 saving and transmitting the angles by which each image 602a-c is rotated, once a submit button or its equivalent is hit.

Figure 7:
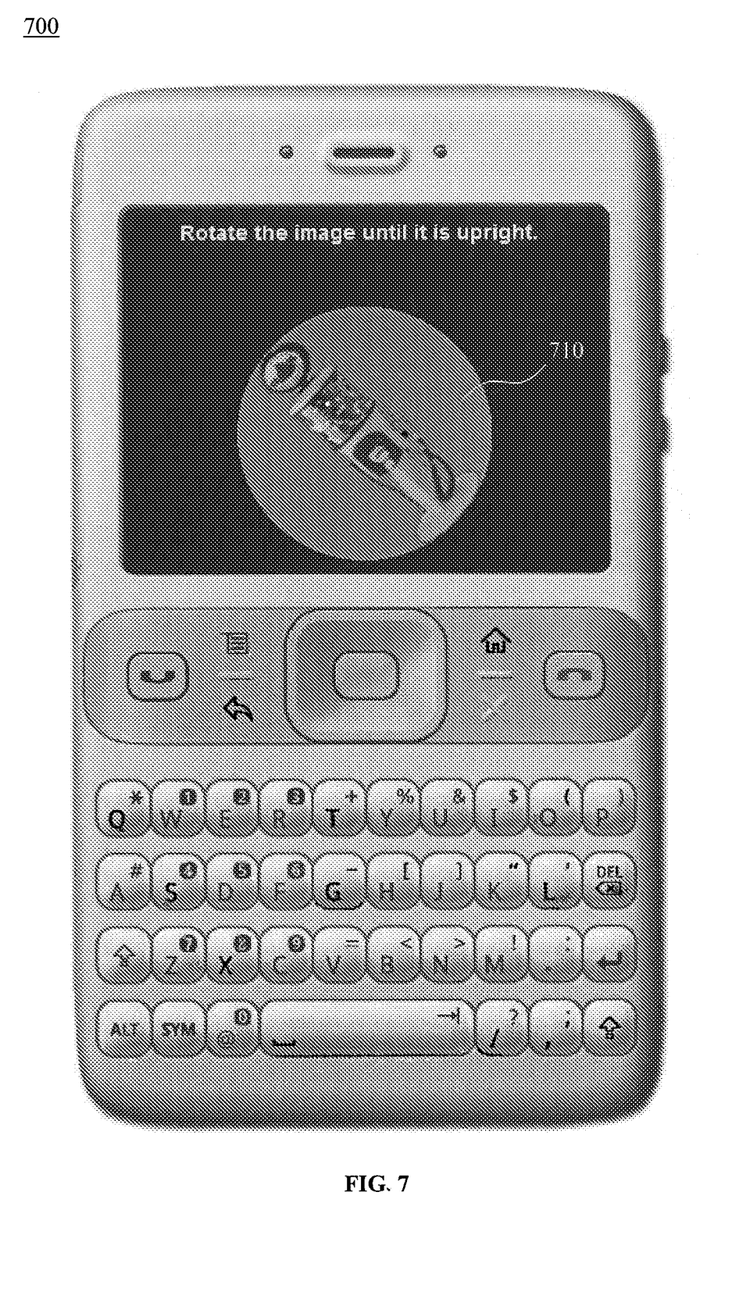
FIG. 7 is another example image displayer according to an embodiment of the present invention.

FIG. 7 is another example of an image displayer according to an embodiment of the present invention. As shown in FIG. 7, an image 710 is displayed on a mobile device 700. Users can rotate the image itself Using mobile device 700, a user may use his/her finger and rotate the image 710 if the display is a touchscreen. This direct manipulation method is more intuitive and allows for relative movements (e.g. nudge, lift the finger, then nudge again).

Figure 8A:
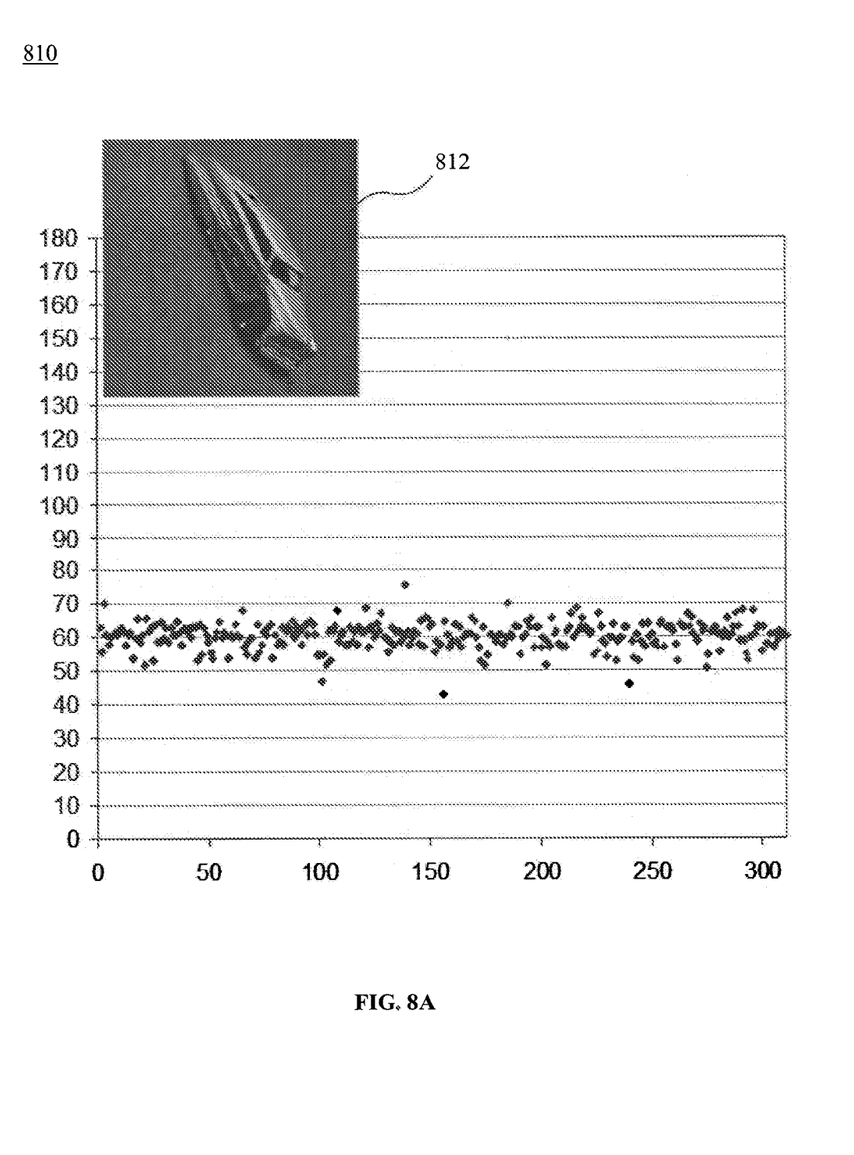
FIGS. 8A-C are examples of plotted graphs based on collected individual user-suggested angles for three images according to an embodiment of the present invention.
Figure 8B:
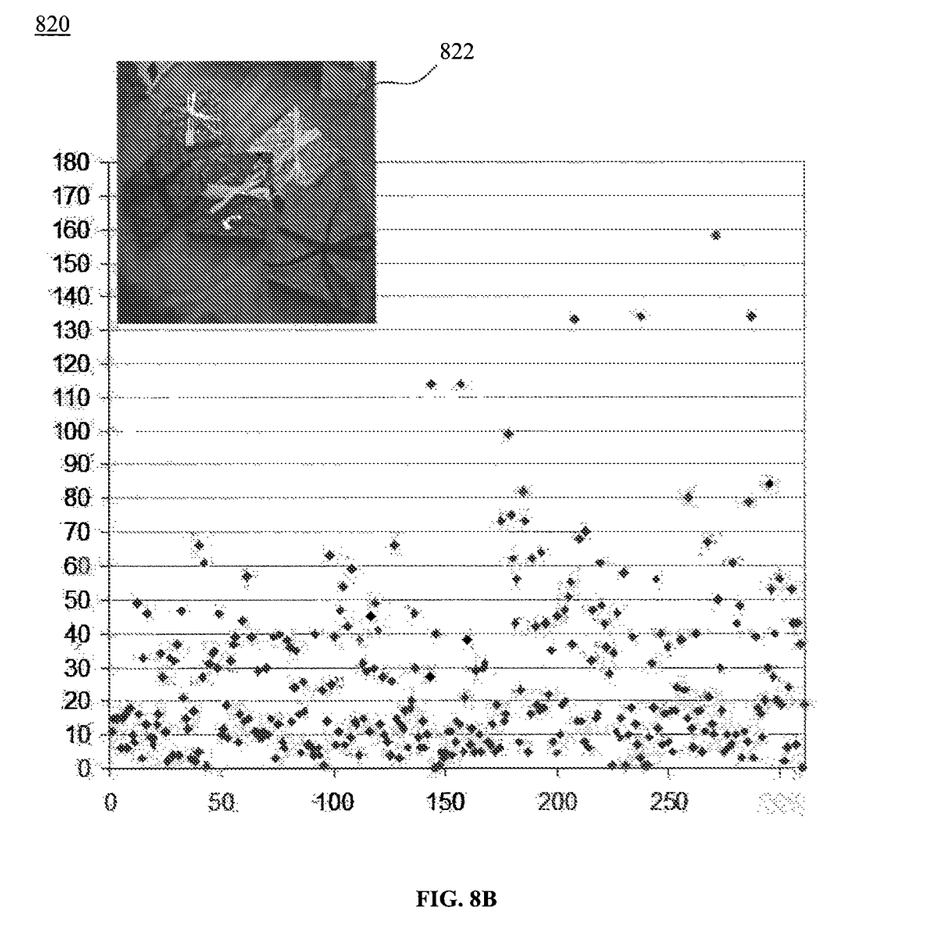
Figure 8C:
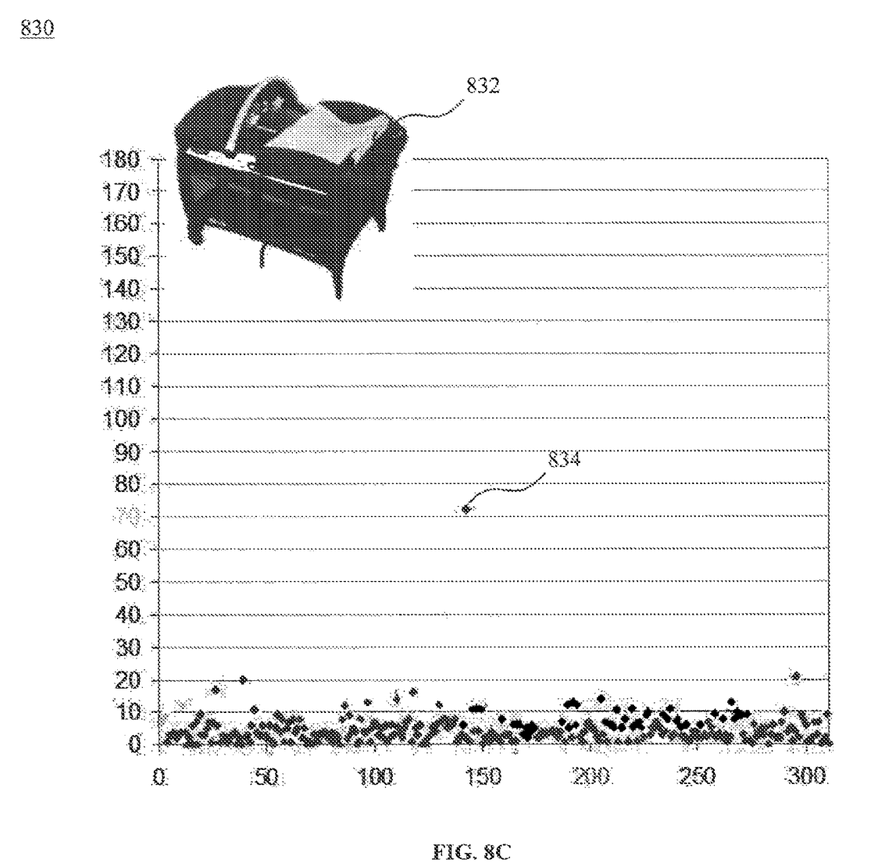

FIGS. 8A-C are examples of plotted graphs based on collected individual user-suggested angles for three images according to an embodiment of the present invention. In FIG. 8A, a graph 810 for an image 812 taken at an angle shows that users are guessing an angle of 60 degrees on average. The standard deviation shows that the data is close to the mean (or average angle). Therefore image 812 can be corrected with high confidence by rotating image 812 by 60 degrees. In FIG. 8B, a graph 820 for an image 822 shows a lower confidence that the mean angle is an accurate adjustment. In FIG. 8C, according to a graph 830 for an image 832, individual user-suggested angles that are more than one standard deviation out can be removed when determining a correction angle. This is exemplified by data point 834 representing an individual user-suggested angle of about 70 degrees.

Computer Systems

Figure 9:
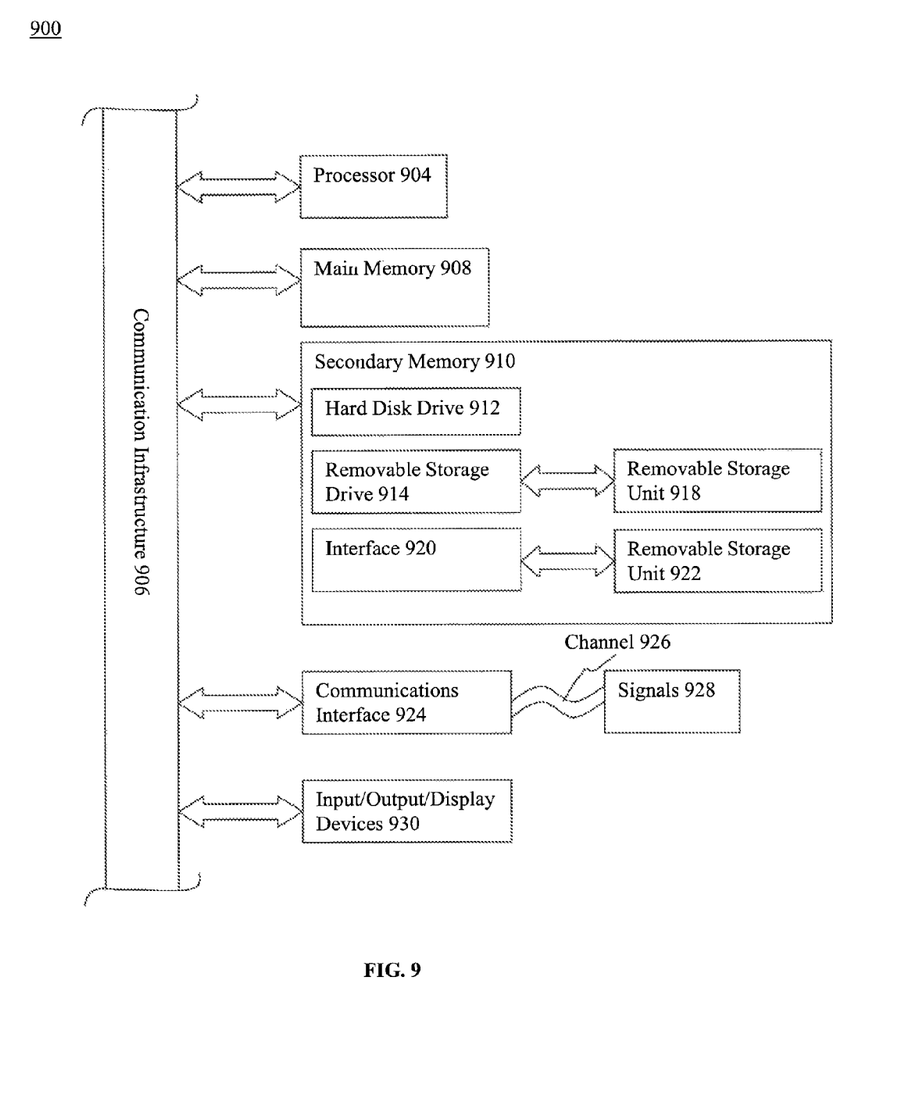
FIG. 9 is an example computer system according to an embodiment of the present invention.

The present invention may be implemented using hardware, software or a combination thereof and may be implemented in a computer system or other processing system. The hardware, software or the combination can embody any of the modules in FIG. 4 and/or any stage in FIG. 5. In an embodiment, the invention is directed toward a computer program product executing on a computer system capable of carrying out the functionality described herein. This applies to any of the servers and/or clients in system 100. An example of a computer system 900 is shown in FIG. 9. Computer system 900 includes one or more processors, such as processor 904. Processor 904 is connected to a communication bus 906. Various software embodiments are described in terms of this example computer system. After reading this description, it will become apparent to a person skilled in the relevant art how to implement the invention using other computer systems and/or computer architectures.

Computer system 900 also includes a main memory 908, preferably random access memory (RAM), and may also include a secondary memory 910. Secondary memory 910 may include, for example, a hard disk drive 912 and/or a removable storage drive 914, representing a floppy disk drive, a magnetic tape drive, an optical disk drive, etc. Removable storage drive 914 reads from and/or writes to a removable storage unit 918 in a well-known manner Removable storage unit 918, represents magnetic tape, optical disk, memory card, etc. which is read by and written to by removable storage drive 914. As will be appreciated, removable storage unit 918 includes a computer usable storage medium having stored therein computer software and/or data.

In alternative embodiments, secondary memory 910 may include other similar means for allowing computer programs or other instructions to be loaded into computer system 900. Such means may include, for example, a removable storage unit 922 and an interface 920. Examples of such may include a removable memory chip (such as an EPROM, or PROM) and associated socket, and other removable storage units 922 and interfaces 920 which allow software and data to be transferred from removable storage unit 922 to computer system 900.

Computer system 900 may also include a communication interface 924. Communication interface 924 enables computer system 900 to communicate with external and/or remote devices. For example, communication interface 924 allows software and data to be transferred between computer system 900 and external devices. Communication interface 924 also allows computer system 900 to communicate over communication networks, such as LANs, WANs, the Internet, etc. Communication interface 924 may interface with remote sites or networks via wired or wireless connections. Examples of communications interface 924 may include a modem, a network interface (such as an Ethernet card), a communications port, a PCMCIA slot and card, etc. Computer system 900 receives data and/or computer program products via communication network 924. Software and data transferred via communications interface 924 are in the form of signals 928 which may be electronic, electromagnetic, optical or other signals capable of being received by communications interface 924. Signals 928 are provided to communications interface 924 via a communications path (i.e., channel) 926. This channel 926 carries signals 928 and may be implemented using wire or cable, fiber optics, a phone line, a cellular phone link, an RF link and other wired or wireless communications channels.

In this document, the terms "computer program medium" and "computer usable medium" are used to generally refer to media such as removable storage drive 914, and a hard disk installed in hard disk drive 912. These computer program products are means for providing software to computer system 900.

Computer programs (also called computer control logic) are stored in main memory 908 and/or secondary memory 910. Computer programs may also be received via signal 928 and communications interface 924. Such computer programs, when executed, enable computer system 900 to perform the features of the present invention as discussed herein. In particular, the computer programs, when executed, enable processor 904 to perform the features of the present invention. Accordingly, such computer programs represent controllers of computer system 900.

In an embodiment where the invention is implemented using software, the software may be stored in a computer program product and loaded into computer system 900 using removable storage drive 914, hard disk drive 912 or communications interface 924. The control logic (software), when executed by processor 904, causes processor 904 to perform the functions of the invention as described herein.

Computer system 900 also includes input/output/display devices 932, such as monitors, keyboards, pointing devices, etc.

The invention can work with software, hardware, and operating system implementations other than those described herein. Any software, hardware, and operating system implementations suitable for performing the functions described herein can be used.

CONCLUSION

The summary and abstract sections may set forth one or more but not all exemplary embodiments of the present invention as contemplated by the inventors, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method to correct a tilted image, comprising:
   receiving a plurality of user-suggested angles over a communication network, wherein each of the user-suggested angles represents a rotation of the tilted image by at least one user; and
   determining, by a computing device, a correction angle to level the tilted image based upon at least the received plurality of user-suggested angles.

2. The computer-implemented method of claim 1, further comprising:
   displaying the tilted image to the at least one user, wherein the user-suggested angles are received in response to the displayed tilted image.

3. The computer-implemented method of claim 2, wherein displaying the tilted image comprises:
   masking the tilted image; and
   displaying the masked titled image to the at least one user.

4. The computer-implemented method of claim 3, wherein the masking comprises creating a round cut-out of the tilted image, and wherein the round cut-out hides each border and edge of the tilted image.

5. The computer-implemented method of claim 2, wherein displaying the tilted image comprises:
   rotating the tilted image by a random angle; and
   displaying the rotated tilted image to the at least one user.

6. The computer-implemented method of claim 5, wherein displaying the rotated tilted image comprises:
   masking the rotated tilted image; and
   displaying the masked rotated tilted image to the at least one user.

7. The computer-implemented method of claim 1, further comprising:
   transmitting, over a communication network, a signal corresponding to the correction angle.

8. The computer-implemented method of claim 1, wherein determining the correction angle comprises:
   determining a common angle, wherein the at least one user has rotated the image by an individual user-suggested angle within a range of angles, and the common angle is within the range;
   summing the common angle and a random angle, wherein the rotation by the at least one user is performed upon the tilted image rotated by the random angle;
   setting, if the sum is nonzero, a collective user-suggested angle to be the common angle; and
   determining the correction angle based upon at least the collective user-suggested angle and the random angle.

9. The computer-implemented method of claim 8, wherein determining a common angle comprises determining the common angle based on the number of the users that have rotated the image within the range of angles, the number exceeding a predetermined threshold.

10. The computer-implemented method of claim 8, wherein determining a common angle comprises determining the common angle based on a majority of the users that have rotated the image within the range of angles.

11. The computer-implemented method of claim 1, wherein the correction angle is a sum of a random angle and a collective user-suggested angle determined based on the received plurality of user-suggested angles, wherein the rotation by the at least one user is performed upon the tilted image rotated by the random angle.

12. A system, comprising:
   a processor;
   a memory communicatively coupled to the processor; and
   an image angle calculator, configured to be executed by the processor and further configured to:
      receive a plurality of user-suggested angles, wherein each of the user-suggested angles represents a rotation of the tilted image by at least one user; and provide a correction angle to level the tilted image based upon at least the received plurality of user-suggested angles.

13. The system of claim 12, further comprising an image displayer configured to be executed by the processor and further configured to display the tilted image to the at least one user, wherein the user-suggested angles are received in response to the displayed tilted image.

14. The system of claim 13, further comprising an image repository, coupled to the image angle calculator, that is configured to suggest a rotation of the tilted image by the correction angle.

15. The system of claim 13, further comprising an image masker, coupled to the image displayer, that is configured to mask the tilted image.

16. The system of claim 15, wherein the image masker is configured to create a round cut-out of the image, wherein the round cut-out hides each border and edge of the image.

17. The system of claim 12, wherein the image angle calculator comprises:

an angle analyzer, that is configured to determine a common angle, wherein at least one of the at least one user rotates the image by an individual user-suggested angle within a predetermined range bounding the common angle;

an angle summer, coupled to the angle analyzer, that is configured to sum the common angle and a random angle, wherein the rotation by the at least one user is performed upon the tilted image rotated by the random angle; and a correction angle calculator, coupled to the angle summer, that is configured to set, if the sum is nonzero, and to calculate the correction angle, wherein the correction angle is a sum of the random angle and the common angle.

18. An article of manufacture comprising a non-transitory computer readable storage medium having instructions encoded thereon that, in response to execution by a computing device, cause the computing device to perform operations comprising:

receiving a plurality of user-suggested angles, wherein each of the user-suggested angles represents a rotation of the tilted image by at least one user; and determining a correction angle to level the tilted image based upon at least the received plurality of user-suggested angles.

* * * * *